United States Patent [19]

Perlman et al.

[11] Patent Number: 4,977,700

[45] Date of Patent: Dec. 18, 1990

[54] CARRIER FOR FISHING LEADERS

[76] Inventors: Robert D. Perlman, 2002 Denver, Fort Lauderdale, Fla. 33326; Jose Pelaez, 471 NW. 132nd Pl., Miami, Fla. 33182

[21] Appl. No.: 428,599

[22] Filed: Oct. 30, 1989

[51] Int. Cl.$^5$ ............................................. A01K 97/00
[52] U.S. Cl. ..................................................... 43/57.2
[58] Field of Search ......................................... 43/57.2

[56] References Cited

U.S. PATENT DOCUMENTS

| 1,416,142 | 5/1922 | Trumble | |
|---|---|---|---|
| 1,451,256 | 4/1923 | Gardner | 43/57.2 |
| 2,667,010 | 1/1954 | Anderson | 43/57.2 |
| 2,670,563 | 3/1954 | Anderson | 43/57.2 |
| 3,213,564 | 10/1965 | Borell | 43/57.2 |
| 3,564,755 | 2/1971 | Indgreen, Sr. | 43/57.2 |
| 3,713,244 | 1/1973 | Alotta | 43/57.2 |
| 4,179,834 | 12/1979 | Thomas | 43/57.2 |

Primary Examiner—Richard K. Seidel
Assistant Examiner—James Minen
Attorney, Agent, or Firm—Warren L. Franz

[57] ABSTRACT

A fishing leader carrier in the form of an open-ended, hollow tube has teeth at one end to receive the leader hooks and slots at the opposite end for aligning individual leaders to be added to or released from the frictional clamping action of a resilient ring positioned annularly of the external cylindrical surface of the tube and running laterally across a midportion of the slots. A block of water buoyant material fitted inside the tube provides flotation.

5 Claims, 1 Drawing Sheet

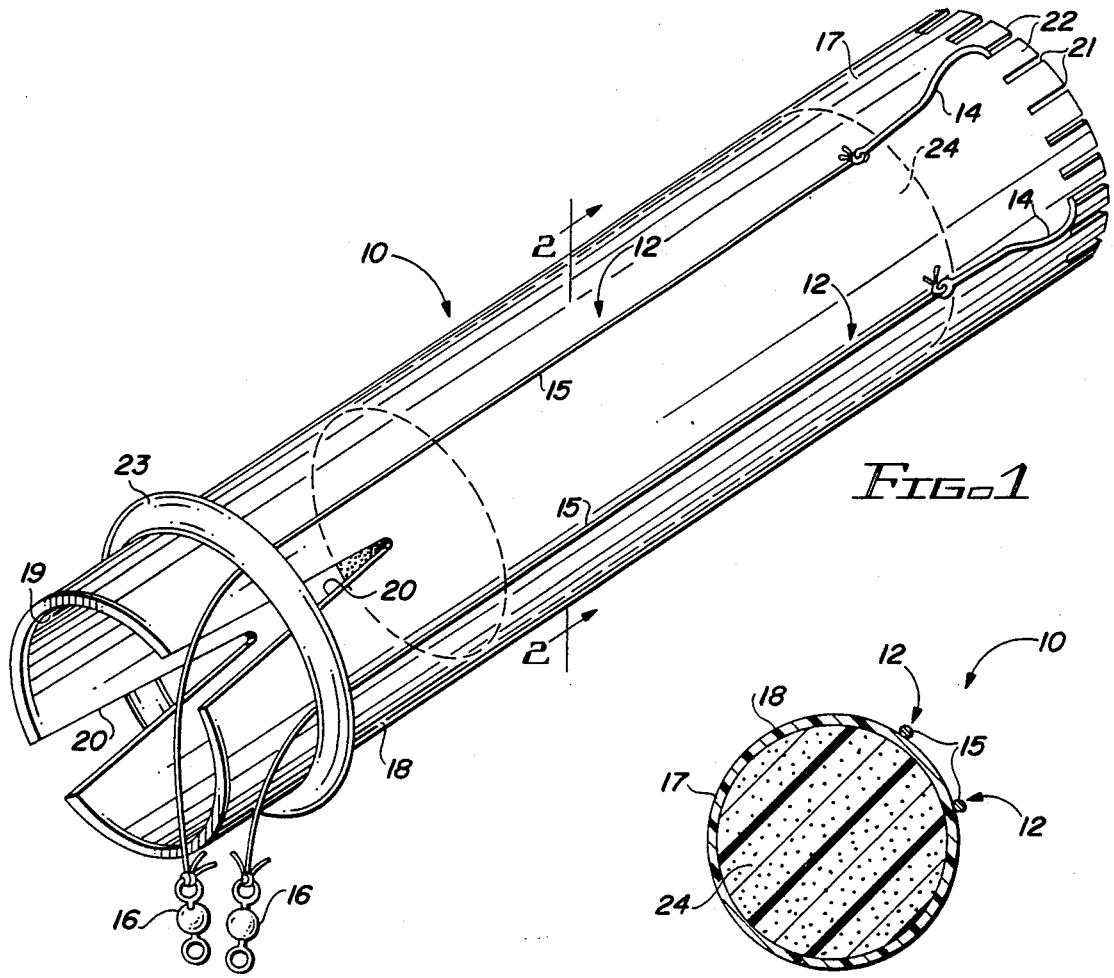
FIG. 1
FIG. 2
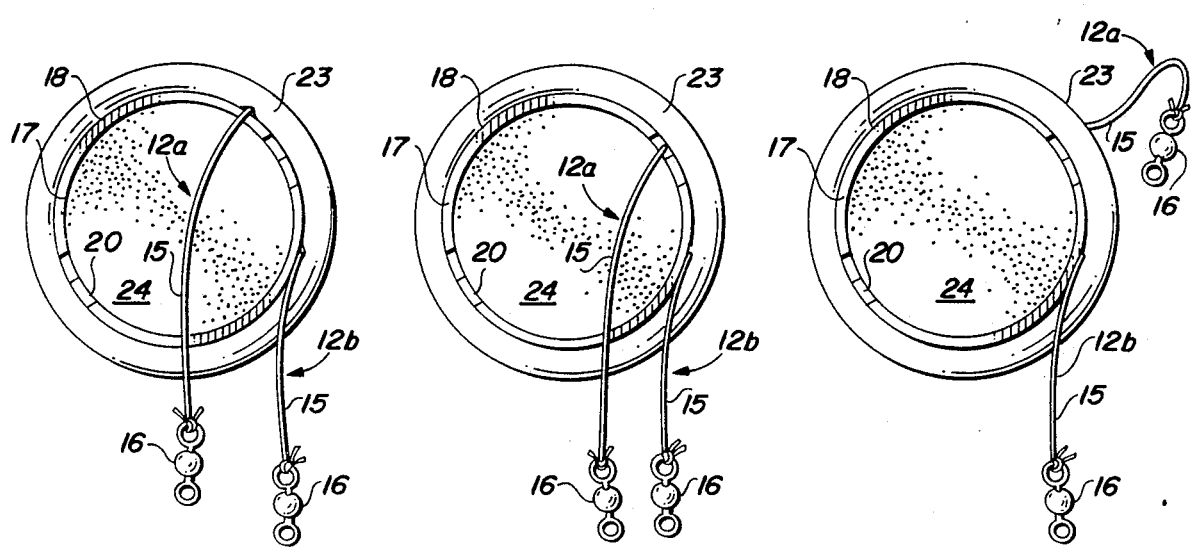
FIG. 3A
FIG. 3B
FIG. 3C

CARRIER FOR FISHING LEADERS

This invention relates to a carrier for releasably retaining a plurality of fishing leaders; and, in particular, to such a carrier having improved means for adding leaders to and releasing leaders from the same.

BACKGROUND OF THE INVENTION

It is common for fishermen to facilitate the replacement of hooks on the ends of the full lengths of their fishing lines by having with them a plurality of leaders, which are short lengths of line having hooks already at one end and swivel eyelets or loops at the opposite free end. Various leader carriers are known for transporting such leaders for this purpose. The carriers serve to present the leaders in an organized fashion, prevent their entanglement, and to shield the user from the barbed points of the hooks. Examples of carriers of the type to which the invention relates are shown in U.S. Pat. Nos. 1,416,142; 1,451,256; 3,213,564; 3,564,755; and 4,179,834.

Conventional leader carriers typically employ a rectangular or tubular elongated body member having means thereon for attaching the leader hooks and means, longitudinally spaced from the hook receiving means, for attaching the eyelet or looped ends so that the leaders can be extended in separated positions generally longitudinally along an external surface of the body member. The hooks are normally received with their points facing an interior or shielded portion of the carrier. In the usual arrangement, either the hook or loop end is first attached to the carrier and then the leader is drawn out to attach the opposite end at another point on the carrier, with the leader line maintained in tension. Many of these devices are complex, difficult to load, or have posts protruding from exposed surfaces.

Of particular interest to the present invention is the carrier shown in Trumble U.S. Pat. No. 1,416,142 which has no externally protruding posts and to which leaders can be conveniently added or removed. The Trumble carrier comprises a longitudinally-tapered, tubular body member with a central pocket at its small end into which the points of the hooks are fitted. The leader lines are extended lengthwise against the outer surface of the body, and held in tension to keep the hooks in place by means of a ring which is slid over the looped ends of the leaders towards the maximum diameter end of the body. To remove a leader from the carrier, the ring is advanced toward the minimum diameter end, which frees the looped ends of the leaders sufficiently from the gripping action of the ring in order to permit the removal (or addition) of a leader. A disadvantage of the Trumble fishing "snell" or leader carrier is that sliding the ring forward to release (or add) a single leader, requires the simultaneous release of all other leaders. The carrier in accordance with the present invention overcomes this disadvantage, while retaining other advantages of Trumble, and, furthermore, provides additional advantages as well.

SUMMARY OF THE INVENTION

It is an object of the present invention to provide an improved carrier for releasably retaining a plurality of fishing leaders so that each can be conveniently individually added and removed from the carrier without releasing the remaining leaders.

In accordance with the invention, a fishing leader carrier is provided which has an elongated body member with a longitudinally extending external surface and a cavity that opens thereon. The body member has means for receiving the hooks of a plurality of leaders in, preferably, shielded manner; and means, longitudinally spaced from the hook receiving means, for frictionally clamping the free ends of the leaders against the surface when the hooks are thus received. The leaders are individually releasable from or grippable by the clamping means by moving their free ends respectively laterally into and out of alignment with the cavity opening.

In a preferred embodiment of the invention, described in greater detail below, the body member is a hollow tube having teeth configured by multiple, angularly-spaced slits formed at one end of the tube and into which the leader hooks can be brought into separated positions. A resilient ring positioned annularly of the tube, midway along the length of a longitudinal slot formed at the other end, serves to grip the free ends of the leaders as they are extended longitudinally along the tube and shifted circumferentially, laterally of the tube from positions in to positions out of alignment with the slot. The described embodiment is advantageously provided with an insert of water buoyant material to impart flotation capability to the carrier in case it is accidentally dropped in the water.

BRIEF DESCRIPTION OF THE DRAWINGS

An embodiment of the invention has been chosen for purposes of illustration and description, and is shown in the accompanying drawings wherein;

FIG. 1 is a perspective view of a fishing leader carrier constructed in accordance with the principles of the invention;

FIG. 2 is an enlarged section view of the same carrier, taken along the line 2—2 of FIG. 1; and FIGS. 3A–3C are a sequence of left end views of the carrier, useful in understanding the operation of the invention.

Throughout the drawings, like elements are referred to by like numerals.

DETAILED DESCRIPTION OF THE PREFERRED EMBODIMENTS

FIGS. 1–3 show an illustrative embodiment of a carrier 10 incorporating the principles of the invention and configured to releasably retain a plurality of fishing leaders 12, each having a hook 14 at one end connected to a length of line 15 and a swivel eyelet 16 connected to the same line 15 at an opposite free end.

The apparatus 10 comprises an elongated body member in the form of a hollow tube 17 having a longitudinally extending external cylindrical surface 18 and a central cavity 19 opening onto the surface 18 at diagonally opposite longitudinal slots 20 located at one end of the tube 17. The other end of the tube 17 has a plurality of longitudinal slits 21 formed at angularly-spaced intervals about the circumference of the tube 17, to present a plurality of teeth 22 between which the barbed points of the hooks 14 can be received. Means, in the form of a resilient ring 23 received annularly about the surface 18 and disposed laterally across a midportion of the slots 20, is provided for frictionally clamping the free ends of the lines 15 against the surface 18.

The tube 17 may suitably be a piece of hollow, open-ended PVC tubing having an external surface 18 of uniform outer diameter, and the ring 23 may suitably be a conventional O-ring of inner diameter slightly less than the tube diameter chosen so that the ring can be slid on and elastically retained in the annular position shown. The slits 21 may be advantageously cut in from one end of the tubing at widths and intervals chosen to accommodate a variety of different sized hooks 14; and the slots 20 may be advantageously cut in from the other end and suitably rounded and tapered to provide a noncutting guideway into which the free ends of the leaders 12 can be brought, as further described below. The tube 17 is preferably provided with a block 24 of water buoyant material, such as styrofoam, which can be force fitted into the hollow interior of the tube 17 at a position not to interfere with the functioning of the slots 20 or slits 21. The block 24 serves to provide flotation of the carrier 10 in case it accidently falls into the water.

The operation of the carrier 10 can be understood with reference to the sequence of slot 20 end views shown in FIGS. 3A-3C. As is evident from FIG. 1, the longitudinal spacing between the hook retaining slits 21 and the line clamping ring 23 is less than the length of the leaders 12. This facilitates drawing the lines 15 out and pulling them taut between the slits 21 and the ring 23, to assure that the hooks remain in the slits 21. In their retained positions, the individual leaders 12a, 12b extend longitudinally in separated positions along the external surface 18. The barbed points of the hooks 14 are faced inwardly toward the hollow interior at one end of the tube 17 to shield the user from them, and the lines 15 are clamped frictionally between the surface 18 and the ring 23 adjacent the other end of the tube 17 to keep the lines 15 in tension.

To release an individual leader 12a, without releasing another leader 12b, the leader 12a is moved laterally, circumferentially of the surface 18, until a point on the line becomes aligned with one of the slots 20, as shown in FIG. 3B. This places the line 15 of the leader 12a at a position where the inner diameter of the ring 23 is not in engagement with the outer surface 18, thereby releasing the leader 12a from the clamping action of the ring 23 and permitting it to be unhooked and its free end with the swivel 16 to be brought out from under the ring 23 through the slot 20, as indicated in FIG. 3C. The other leader 12b remains in its clamped position as before, unaffected by the release of the leader 12a. This is in contrast to the releasing action in Trumble U.S. Pat. No. 1,416,142, referenced above, wherein release is effected by sliding a ring toward the small diameter end of a tapered tube. In Trumble, all leaders or "snells" are released simultaneously.

The process of adding a leader to the carrier 10 proceeds in generally the reverse of the sequence shown in FIGS. 3A-3B. The hook 14 of the leader 12 to be added is brought into one of the slits 21 between adjacent teeth 22. The free end of the leader is then drawn out toward the slot 20 end of the tube 17, while keeping enough tension on the line 15 to keep the hook 14 in place. The swivel eyelet 16 is threaded through the cavity opening 20 above the ring 23 and extended below the ring 23. The free end of the added leader 12 is then grasped below the ring 23 and moved circumferentially of the tube 17, laterally from the cavity opening 20 onto the surface 18, so that the line 15 is clamped between the ring 23 and the surface 18.

The purpose of the slot 20 and cavity 19 in the leader adding and removal procedures is to provide a region under the ring 23 which does not contact surface 18. The region should give a sufficient gap so that aligning the leader line 15 with that region will relieve the clamping action of the ring 23 on the surface 18 and permit the free end of a leader 12 to be drawn under or out from under the ring 23. The cavity 19 can, thus, suitably be merely an indentation which opens out onto the outer surface 18 and is of sufficient depth and longitudinal extent to permit the swivel eyelet 16 to pass into the cavity 19 at the opening 20 and below the ring 23. Where the carrier 10 is designed for use with leaders 12 having loops (not shown) instead of eyelets 16, the dimensioning of the cavity can be smaller than where eyelets 16 are to be accommodated. Moreover, rather than providing the cavity in the surface 18, the surface 18 can be kept continuous and an equivalent leader-releasing discontinuity may be provided on the inner diameter of the ring 23 to accomplish the same purpose. The arrangement shown, however, provides the advantages that the integrity and uniformity of the ring 23 is maintained and ample maneuvering room is provided at the slot 20 and tube interior 19 to permit the rapid addition and removal of leaders. The tube can optionally be tapered to provide a simultaneous release feature for all leaders as in Trumble, in addition to the individual leader clamp release feature of the invention.

Other equivalent means can also be provided for receiving the hooks 14 on the carrier body member 17. Although the teeth arrangement is considered useful to help establish angular separation of the respective leader hooks 14, that end of the tube 17 could also be left unslit, with the hooks caught on the continuous circular edge of the tube 17. Further, the same features and principles of the invention described above, may likewise be implemented in a nontubular rectangular or other shaped body member structure.

Those skilled in the art to which the invention relates will appreciate that various other substitutions and modifications may also be made to the detailed description above, without departing from the spirit and scope of the invention defined by the claims below.

What is claimed is:

1. Apparatus for releasably retaining a plurality of fishing leaders, each having an end with a hook, a length of line connected to the hook and a free end, said apparatus comprising:

an elongated body member having a longitudinally extending smooth external cylindrical surface and a cavity with an opening onto said surface;

means on said body member surface for receiving the hooks of the leaders; and means on said surface, longitudinally spaced from said hook receiving means and disposed transversely across a midportion of said cavity opening, for frictionally clamping the free ends of the leaders against said surface when the hooks are received by said hook receiving means and the lines of the leaders are respectively drawn longitudinally out through said cavity and respectively moved transversely from said cavity onto said surface; and said opening defining means for individually releasing said leader free ends from said clamping action when the leader lines are respectively moved transversely back to said cavity.

2. Apparatus for releasably retaining a plurality of fishing leaders, each having an end with a hook, a length of line connected to the hook and a free end, said apparatus comprising:

a tubular body member having first and second ends, an external cylindrical surface, and a hollow interior with an opening onto said surface;

means adjacent said first end on said body member for receiving the hooks of the leaders; and a ring received annularly on said surface adjacent said second end and disposed laterally across a midportion of said opening; said ring being dimensioned, configured and adapted for frictionally clamping the free ends of the leaders against said surface when the hooks are received by said hook receiving means and the lines of the leaders are respectively drawn into alignment with said opening and moved laterally from said opening to positions between said ring and said surface; said ring being further dimensioned, configured and adapted for individually releasing said leader free ends from said clamping action when the leader lines are respectively moved laterally back into alignment with said opening.

3. Apparatus for releasably retaining a plurality of fishing leaders, each having an end with a hook, a length of line connected to the hook and a free end, said apparatus comprising:

a hollow tube having an external cylindrical surface with an outside diameter, first and second ends, means at said first end for receiving hooks of the leaders in shielded positions, and a longitudinal slot formed at said end; and a resilient ring of inner diameter less than said outside diameter and received annularly about said surface at a position disposed laterally across a midportion of said slot; said ring being dimensioned, configured and adapted for frictionally clamping the free ends of the leaders against said surface when the hooks are received by said hook receiving means and the lines of the leaders are drawn respectively into alignment with said slot and moved laterally from said slot to positions between said ring and said surface; said ring being further dimensioned, configured and adapted for individually releasing said leader free ends when the leader lines are respectively moved laterally back into alignment with said slot.

4. Apparatus as in claim 3, wherein said hook receiving means comprises a plurality of slits formed at angularly-spaced intervals about the circumference of said tube at said first end.

5. Apparatus as in claim 3, further comprising a block of water buoyant material located within the hollow of said tube.

* * * * *